Feb. 28, 1961 E. G. RIX 2,972,814
MEASURING INSTRUMENT
Filed March 5, 1958 2 Sheets-Sheet 1
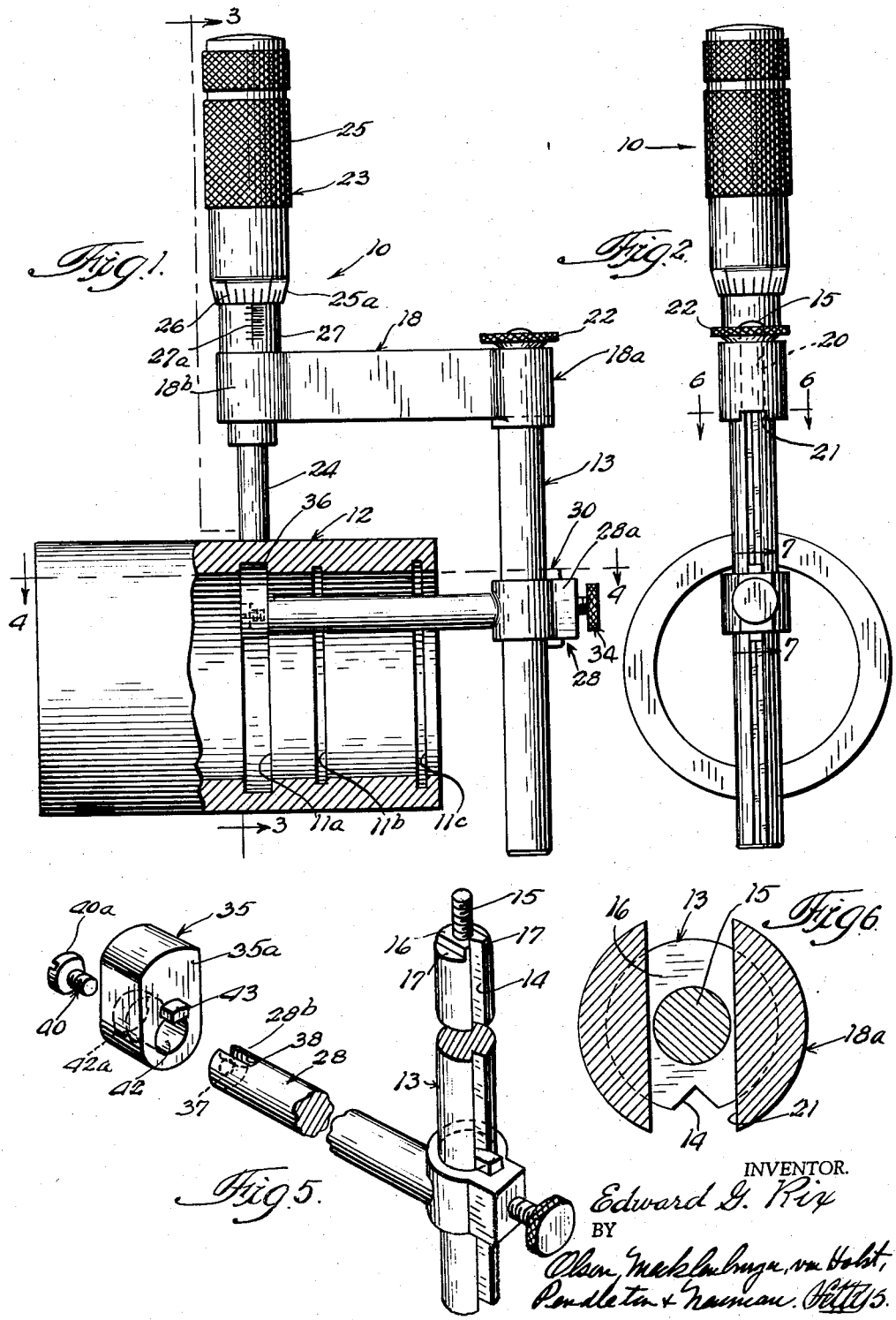
INVENTOR.
Edward G. Rix
BY

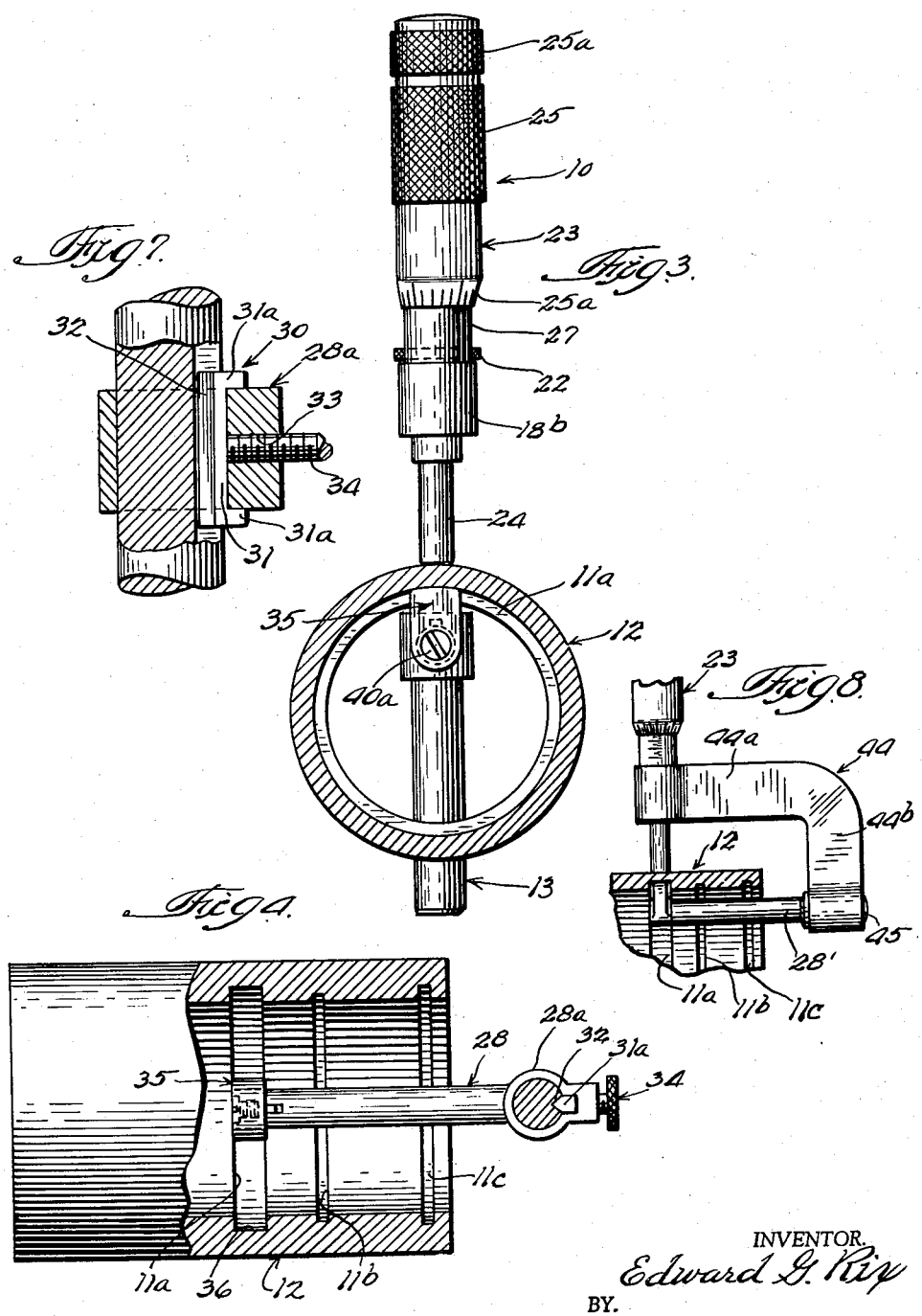

United States Patent Office 2,972,814
Patented Feb. 28, 1961

2,972,814
MEASURING INSTRUMENT

Edward G. Rix, Wilmette, Ill., assignor to Stanley L. Shetler and Edward G. Rix, a copartnership doing business as Illinois Metal Products Filed Mar. 5, 1958, Ser. No. 719,245

2 Claims. (Cl. 33—165)

This invention relates to a measuring instrument and, more particularly, to an instrument capable of accurately measuring the size of an internal groove or the ilke fomed in a tubular member.

In the manufacture of certain types of precision machines or apparatus, the matter of close tolerances or clearances between certain parts becomes of utmost importance in minimizing operational failure or wear of such machines or apparatus. Various measuring instruments have heretofore been provided for accurately determining dimensions of certain types of machine parts; however, such instruments are beset with one or more shortcomings, such as: (a) they are too complex in design, and/or awkward to handle, thereby requiring the talents of a skilled person to make an accurate measurement, and/or: (b) they are not adaptable to accurately measure internal grooves or recesses or the like varying over a wide range of size and shape.

Thus, it is one of the objects of this invention to provide a measuring instrument which overcomes the aforementioned shortcomings of the prior art.

It is a further object of this invention to provide a measuring instrument which enables even an unskilled person to readily make an accurate measurement.

Further and additional objects will appear from the description, accompanying drawings, and appended claims.

In accordance with one embodiment of this invention, an improved instrument is provided for measuring the size of an internal recess formed in a tubular-shaped work-piece or the like. The improved instrument includes an elongated element having removably fixed to one end thereof a first elongated arm extending at substantially a right angle therefrom. Adjustably mounted on the free end portion of the first arm is an extensible and retractable spindle, which is adapted to have a portion thereof contact the outer peripheral surface of the work-piece. Means is provided on the spindle for measuring the amount of adjustment thereof relative to the first arm. Slidably mounted on the elongated element for movement toward or away from the first arm is a second arm which extends at substantially a right angle from said element. The first and second arms are disposed in substantially coplanar relation. Means is carried on the second arm and cooperates with the elongated element to retain the second arm in selected positions of adjustment with respect to said element. Removably affixed to the free end portion of the second arm is an adapter piece which is provided with a protuberance projecting in a direction toward the first arm. The protuberance of the piece is disposed in alignment with the axis of the spindle and is adapted to be accommodated within and contact the base of the recess in the work-piece.

For a more complete understanding of this invention, reference should be made to the drawings, wherein:

Figure 1 is a front elevational view of the improved instrument shown accommodating a work-piece.

Fig. 2 is a right side elevational view of Fig. 1.

Fig. 3 is a view taken along line 3—3 of Fig. 1.

Fig. 4 is a view taken along line 4—4 of Fig. 1.

Fig. 5 is an enlarged perspective view of the elongated element, second arm, and adapter piece of the improved apparatus shown partially in exploded relation.

Fig. 6 is an enlarged sectional view taken along line 6—6 of Fig. 2.

Fig. 7 is an enlarged fragmentary sectional view taken along line 7—7 of Fig. 2.

Fig. 8 is a fragmentary front elevational view of a modified form of the improved instrument shown accommodating a work-piece.

Referring now to the drawings and, more particularly, to Figs. 1–3, an improved instrument 10 is shown for use primarily in measuring the depth or size of an insternal recess or groove 11a, 11b or 11c, formed in a tubular-shaped work-piece 12. In the manufacture of precision machines and apparatus, the accurate measurement of such recesses or grooves is extremely important in order to prevent operational failure of the machine or apparatus by reason of the improper tolerance or clearance provided between such recesses or grooves and retaining rings, O-rings, etc. The improved instrument 10, in this instance, comprises an elongated element 13 which is preferably formed of cylindrical bar stock material having formed in the periphery thereof an elongated slot or way 14 (see Fig. 5). The way 14 extends longitudinally substantially the full length of element 13 and is substantially parallel to the longitudinal axis thereof. Projecting from one end of element 13 and coaxial with respect to the longitudinal axis of said element is a threaded stud 15. The stud 15 projects from a pedestal 16 which is formed in the end of element 13 by a pair of diametrically opposed segmental cutouts 17 formed in the periphery of element 13 (see Fig. 5). The stud 15 and pedestal 16 are adapted to be assembled with an elongated first arm 18 which, as shown, is preferably of rectilinear configuration, extending at substantially a right angle with respect to the axis of element 13. Element 13 is affixed to the end 18a of arm 18, which end is provided with a transversely extending bore 20 through which the threaded stud 15 extends. The underside of arm end 18a is provided with a recess 21, of such configuration as to readily accommodate the pedestal 16 formed on the end of element 13. The pedestal 16, in cooperation with the recess 21, prevents relative twisting of arm 18 with respect to element 13 when said parts are in assembled relation. Threadably engaging the projecting end of threaded stud 15 is a nut 22 which, upon being drawn up tight on stud 15, rigidly maintains element 13 and arm 18 in assembled relation.

Mounted on the other end portion 18b of arm 18 is a spindle or spindle assembly 23, which is of conventional construction and referred to in the trade as a "micrometer head." Briefly, the head is provided with an extensible and retractable stud 24 which is adapted to contact the outer periphery of the work-piece 12. The upper end of the micrometer head is provided with a rotatable outer sleeve 25 which is adapted to effect adjustment of stud 24. The end of the outer sleeve 25, adjacent first arm 18, is beveled, as shown at 25a, and is provided with a plurality of symmetrically arranged calibrations 26. Calibrations 26 cooperate with calibrations 27a formed on the periphery of a stationary central portion 27 comprising a part of head 23. On portion 27 is pressed-fit the end 18b of arm 18, so that the head 23 is integral with arm 18. The longitudinal axis of stud 24 is disposed normal to the longitudinal axis of arm 18 and, in this instance, is substantially parallel to the longitudinal axis of elongated element 13.

Slidably mounted on elongated element 13 is a second elongated arm 28 which, in this instance, has the longitudinal axis thereof disposed substantially parallel to the longitudinal axis of first arm 18. One end 28a of arm 28 encompasses the periphery of element 13 and carries a locking means 30 which is adapted to retain the arm 28 in selected positions of slidable adjustment on element 13.

Means 30, as shown more clearly in Fig. 7, comprises a key 31, which has one edge portion 32 thereof corresponding substantially in shape to the cross-sectional configuration of way 14 and has tongues 31a formed at opposite ends thereof which are adapted to engage opposite surfaces of arm end 28a so that the key will move as a unit with arm 28. Arm end 28a is provided with an internally threaded bore 33 in which is disposed a locking screw 34 which, when drawn up tight against key 31, causes the latter to center itself within way 14 and retain the arm 28 in a fixed, non-twisting position with respect to element 13. Upon loosening locking screw 34, the arm 28 is free to slidably move longitudinally of element 13. Thus, when arm 28 is in a rigid position with respect to element 13, the longitudinal axis of arm 13 is in coplanar, substantially parallel relation with respect to the longitudinal axis of first arm 18.

Removably affixed to the free end portion 28b of arm 28 is an adapter piece or anvil 35 which, as shown more clearly in Fig. 5, has one side thereof protruding transversely from the longitudinal axis of arm 28, in a direction toward stud 24. The outer surface of the protuberance 35a is adapted to engage the base 36 of internal recess or groove 11a, 11b or 11c of workpiece 12. It is preferred that the thickness of the protruding portion 35a approximate the cross-sectional dimension of the internal recess or groove in which it is disposed, so as to overcome any tendency of the person using the instrument from tilting the latter relative to a direction normal to the periphery of the work-piece, when the stud end 24 and protuberance 35a are both in contact with work-piece surfaces.

The end 28b of arm 28 is provided with an axially disposed internally threaded bore 37 and a peripheral keyway 38, as shown in Fig. 5. To secure adapter 35 to the end of arm 28 a locking screw 40 is provided which extends through a suitable opening 42 formed in piece 35 and then threadably engage the axial bore 37 formed in arm 28. The outer end surface of piece 35 is countersunk at 42a so as to accommodate the head 40a of screw 40. To insure that the protruding portion 35a of piece 35 is properly aligned with the longitudinal axis of the stud 24, a tongue or lug 43 extends transversely from the inner face of anvil 35 and is adapted to be accommodated in the keyway 38 formed on the end of arm 28. It is most important that the exposed surface of protruding portion 35a which contacts the base 36 of the internal recess or groove be in alignment with the axis of stud 24 and substantially normal thereto, so that when stud 24 is in contact with an exposed peripheral portion of the work-piece 12 and anvil 35 is in contact with the corresponding concealed surface portion of the work-piece, an accurate measurement of the thickness of material of the work-piece at that particular location may be obtained. Where internal recesses or grooves of smaller or greater size are to be measured, adapter pieces of greater or lesser thickness may be utilized and, furthermore, the extent of projection of the protruding piece portion 35a with respect to the arm 28 may be different in various pieces, if desired.

In utilizing the instrument, the proper adapter piece is selected and affixed to the end of arm 28, the stud 24 of the spindle assembly 23 is then moved to a retracted position, whereupon the arm 28 is inserted through the open end of the work-piece until the adapter piece is accommodated within the internal recess or groove to be measured. The arm 28 is then adjusted relative to the elongated element 13, so that the stud 24 requires only a relatively small amount of adjustment to engage the exposed peripheral surface of the work-piece. The locking screw 34 is then drawn up tight, causing the arm 28 and element 13 to assume a fixed position. The operator then turns the outer shell or sleeve portion 25 of the spindle assembly 23 until the free end of stud 24 contacts the outer periphery of the work-piece, whereupon the operator observes the calibrations 26 and 27a to determine the thickness of the work-piece material at this point. The upper sleeve portion 25a of head 23 is a ratchet, so as to prevent the stud 24 being drawn up too tight against the outer periphery of the work-piece 12. The lengths and shapes of element 13 and arms 18 and 28 may be varied from that shown, so as to facilitate positioning of the instrument on a particular work-piece without departing from the scope of this invention. It is essential, however, that the anvil 35 and the axis of the spindle stud 24 be in alignment.

A modified form of improved instrument 10' is shown in Fig. 8, wherein the arm 18 and element 13 of instrument 10 are made integral to form a substantially L-shaped member 44. Portion 44a of member 44 corresponds to arm 18 and portion 44b of member 44 corresponds to element 13. Affixed to the end of portion 44b is an arm 28' which corresponds to arm 28 of instrument 10. The end of portion 44b encompasses an enlarged head 45 formed on the end of arm 28'. A keyway, not shown, is formed in the encompassing end of portion 44b and is adapted to accommodate a key or lug, not shown, carried on the head 45 and thus prevent relative turning of arm 28' on its longitudinal axis, once it is accommodated by head 45.

Where the improved instrument 10 or 10' is intended to be used in measuring internal grooves of only one dimension and thus requiring only an anvil piece 35 of a given size, it may be preferred to make anvil piece 35 and arm 28 or 28' of integral construction.

Thus, it will be seen that a measuring instrument has been provided which is of simple, sturdy construction, and does not require the talents of a skilled person to properly manipulate so as to obtain an accurate measurement of a given work-piece.

While several embodiments of this invention have been described above, it will be understood, of course, that the invention is not to be limited thereto, since many further modifications may be made, and it is contemplated, therefore, by the appended claims, to cover any such modifications as fall within the true spirit and scope of this invention.

I claim:

1. An instrument for measuring the size of an internal recess formed in a workpiece of tubular configuration or the like, said instrument comprising: an elongated element; a first arm affixed to said element and extending angularly therefrom; an extensible and retractable elongated spindle carried on said first arm in spaced relation with respect to said element, for contacting the outer periphery of the workpiece; said spindle including means for measuring the amount of longitudinal adjustment of the same, relative to said first arm; an elongated second arm affixed to and extending angularly outward from said elongated element and in spaced relation with respect to said first arm, said second arm having an outer end surface disposed generally parallel to and adjacent an extension of the longitudinal axis of said spindle, the free end portion of said second arm being positionable within the interior of the workpiece; and an adapter removably mounted on said outer end surface; said adapter including a protuberance extending toward said spindle beyond the periphery of said outer end surface; said protuberance having a pair of spaced substantially flat side surfaces parallel to each other and to the axis of said spindle and transverse to said second arm, and an upwardly convex substantially semi-cylindrical shaped intermediate surface having a directrix oriented substantially normal to said flat side surfaces and intersecting the longitudinal axis of said spindle.

2. The instrument recited in claim 1, wherein the free end portion of said second arm is provided with a peripheral groove disposed substantially parallel to the axis of said second arm, and said adapter is provided with a lug disposed within said groove said adapter means body portion is in nonrotating relation with respect to said second arm and including securing means passing through said adapter, axially of said second arm, and securing said adapter to said second arm.

References Cited in the file of this patent

UNITED STATES PATENTS

| | | |
|---|---|---|
| 1,234,342 | Johnson | July 24, 1917 |
| 2,246,066 | Rothe | June 17, 1941 |
| 2,469,926 | Layton | May 10, 1949 |
| 2,541,821 | Kneissler | Feb. 13, 1951 |
| 2,607,123 | Sheridan | Aug. 19, 1952 |
| 2,665,491 | Henslee | Jan. 12, 1954 |